United States Patent
Kirishima

(10) Patent No.: US 8,887,311 B1
(45) Date of Patent: Nov. 11, 2014

(54) SCANNING PROBE MICROSCOPE

(71) Applicant: Shimadzu Corporation, Kyoto (JP)

(72) Inventor: Kaori Kirishima, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 14/075,734

(22) Filed: Nov. 8, 2013

(51) Int. Cl.
- *G01Q 10/00* (2010.01)
- *G01Q 20/00* (2010.01)
- *G01Q 30/00* (2010.01)
- *G01Q 30/04* (2010.01)
- *G01Q 70/00* (2010.01)
- *G01Q 20/02* (2010.01)
- *G01Q 90/00* (2010.01)

(52) U.S. Cl.
CPC ..................................... *G01Q 10/00* (2013.01)
USPC ....................................... 850/5; 250/6; 250/8

(58) Field of Classification Search
USPC ....................................... 850/5, 6, 8
See application file for complete search history.

(56) References Cited

U.S. PATENT DOCUMENTS

| | | | | |
|---|---|---|---|---|
| 7,571,638 | B1 * | 8/2009 | Kley | 73/105 |
| 8,615,811 | B2 * | 12/2013 | Shigeno et al. | 850/5 |
| 2010/0031405 | A1 * | 2/2010 | Kley | 850/56 |
| 2012/0246768 | A1 * | 9/2012 | Shigeno et al. | 850/5 |

FOREIGN PATENT DOCUMENTS

| | | |
|---|---|---|
| JP | 10-96737 A | 4/1998 |
| JP | 2000-19093 A | 1/2000 |
| JP | 2000-329772 A | 11/2000 |

* cited by examiner

*Primary Examiner* — Bernard E Souw
(74) *Attorney, Agent, or Firm* — Sughrue Mion, PLLC

(57) ABSTRACT

A scanning probe microscope that facilitates the optical axis adjustment operation at the time of initial cantilever installation and at the time of cantilever replacement. During the optical axis adjustment operation, markers are displayed on the video camera image at the cantilever and laser light center of luminance locations, and the markers, which follow the movement of the laser light location, are visually monitored and superposed. Furthermore, optical axis adjustment for a new cantilever is performed using marker location coordinate data stored after the initial optical axis adjustment. Moreover, by setting the target location coordinates, the direction of movement of laser light and the distance to the target location can be ascertained numerically.

4 Claims, 4 Drawing Sheets

SCANNING PROBE MICROSCOPE

CROSS-REFERENCE TO RELATED APPLICATIONS

The entire contents of Japanese Patent Publication No. 2012-225722 to the same inventors, published Nov. 15, 2012, are incorporated herein by reference.

TECHNICAL FIELD

The present invention relates to a scanning probe microscope, particularly, to the optical axis adjustment of the microscope.

BACKGROUND ART

A representative example of a scanning probe microscope (SPM) is an atomic force microscope. An atomic force microscope determines the shape of a specimen surface by measuring physical forces arising between the specimen and a cantilever probe, and has a configuration as shown schematically in FIG. 5.

Figure 5:
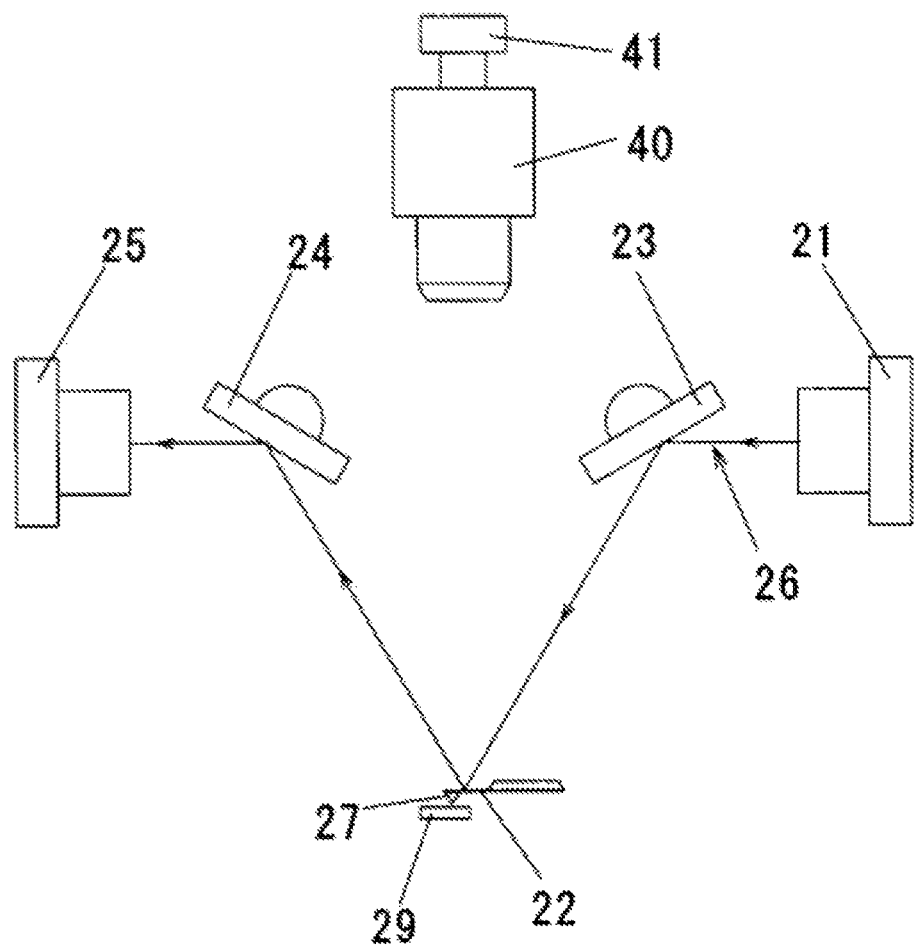

FIG. 5 schematically illustrates the configuration of the major parts of the microscope, which comprises a cantilever 22 having a probe 27 at its tip, a laser light source 21, reflective mirrors 23 and 24, and quadrant photodetector 25. It will be noted that the size of the probe 27 and the cantilever 22 shown in FIG. 5 has been exaggerated in relation to the other elements.

Normally, laser light 26 from laser light source 21 is irradiated onto the top surface of the cantilever 22 via reflective mirror 23, and the resulting reflected light is inputted into the quadrant photodetector 25 via reflective mirror 24. In this state, as the probe 27 and specimen 29 are moved closer to each other to a distance of 1 nm or less, interatomic forces (attraction and repulsion) act between the atoms of the tip of the probe 27 and the atoms of the surface of the specimen 29 and the probe 27 moves up or down, and as a result, the cantilever 22 bends upward or downward. Due to the bending of the cantilever 22, the location where the reflected laser light enters the quadrant photodetector 25 changes. Due to the aforesaid change, the output of the quadrant photodetector 25 changes, and based on the change of this output, feedback control is performed by means of a scanner (not illustrated) in order to keep the distance between the probe 27 and the specimen 29 constant (i.e. to keep the interatomic forces constant). Therefore, by two-dimensionally scanning the probe 27 or specimen 29 while performing distance control between the probe 27 and the specimen 29, a concavoconvex image (constant force image) of the surface of the specimen 29 can be displayed on an image display device (not illustrated).

In an atomic force microscope, adjusting the position of the quadrupole photodetector and the laser light such that the laser light from the laser light source allows reflected light of highest intensity to be inputted into the center of the quadrupole photodetector is referred to as "optical axis adjustment." Conventional optical axis adjustment has been carried out through manual operation by an operator.

The conventional optical axis adjustment procedure is presented below.

(First Operation)

While capturing the cantilever 22 and laser light 26 with an optical microscope 40 and checking the image filmed by video camera 41, a laser light adjustment knob (not illustrated) located in the atomic force microscope head (not illustrated) portion is turned to adjust the laser light irradiation location such that the laser light 26 is superposed over the cantilever 22 (referred to as coarse adjustment).

(Second Operation)

The laser light reflected from the cantilever 22 is projected onto a piece of paper directly in front of the quadrant photodetector 25, and the irradiation location of the laser light 26 is adjusted with a laser light adjustment knob (not illustrated) so that the laser light 26 is projected most clearly and roundly (referred to as fine adjustment).

(Third Operation)

The location of the quadrant photodetector 25 is adjusted so that the laser light 26 reflected from the cantilever 22 is irradiated onto the center of the quadrant photodetector 25.

It will be noted that Patent Literature 1 discloses a method in which optical axis adjustment is performed by imparting vibration for optical axis adjustment to the cantilever in a scanning probe microscope.

Furthermore, Patent Literature 2 discloses an optical axis adjustment method and optical axis adjustment aid using a laser light observation member having an irradiation surface wider than the area of the cantilever rear surface instead of the cantilever in a scanning probe microscope. Furthermore, Patent Literature 3 discloses a method of adjustment from outside the container of the quadrant photodetector in a scanning probe microscope installed inside a vacuum container.

PRIOR ART LITERATURES

Patent Literatures (Patent literature 1) Japanese Unexamined Patent Application Publication 2000-19093
(Patent literature 2) Japanese Unexamined Patent Application Publication 2000-329772
(Patent literature 3) Japanese Unexamined Patent Application Publication H10-96737

SUMMARY OF THE INVENTION

However, in an image filmed by a video camera, since the brightness of laser light is strong, the image portions other than the laser light will be displayed as dark, making it difficult to visually confirm the location of the cantilever in the video camera image. Thus, it is difficult to superpose the laser light onto the location of the cantilever.

Furthermore, after adjusting the laser light so that it is superposed over the cantilever using a video camera image, the complex procedure of projecting the light onto a piece of paper directly in front of the quadrant photodetector to perform adjustment of laser light irradiation location is necessary.

Moreover, when adjusting the irradiation location of laser light, the laser light adjustment knob located in the atomic force microscope head part is manually manipulated, so the atomic force microscope head shakes and the video camera image also shakes simultaneously, so it is difficult to distinguish between movement due to laser light adjustment and movement due to shaking of the atomic force microscope head.

In an atomic force microscope, when scanning adjacent specimen surfaces, abrasion of the probe occurs due to the fact that the cantilever directly contacts the specimens. Thus, the cantilever is frequently replaced, and optical axis adjustment becomes necessary at the time of replacement. Therefore, there is a need to make optical axis adjustment at the time of cantilever replacement easier.

To resolve the aforesaid problem, the present invention is a scanning probe microscope comprising a cantilever provided with a probe arranged so as to face a specimen; a laser light source which outputs a laser light; a first reflector which guides laser light radiated from said laser light source toward said cantilever; a second reflector which guides laser light reflected from said cantilever toward a photodetector; a photodetector which detects said laser light; and a video camera which observes the location in the vicinity of the cantilever for optical axis adjustment of said laser light, the scanning probe microscope being characterized in that it comprises a display means which displays, on the video camera image, a cantilever location marker which indicates the location of said cantilever and a laser light center of luminance location marker which indicates the location of the center of luminance of said laser light, wherein the laser light center of luminance location marker moves over the video camera image in a manner that tracks the movement of said laser light.

The present invention furthermore comprises a storage and display means which stores and displays the initial relative positional relationship of markers, indicating the positional relationship of the initial cantilever location marker and initial laser light center of luminance location marker after completion of initial optical axis adjustment for the initial cantilever.

Furthermore, the present invention is characterized in that, when said initial cantilever has been replaced with a new cantilever, the relative location of new laser light in relation to the new cantilever location is calculated on the basis of said initial relative positional relationship of markers and is set as a target location marker, and a coordinate system is provided having said target location marker as its origin.

Moreover, the present invention comprises a control means for superposing said initial laser center of luminance location marker onto said target location marker.

The cantilever location and laser light center of luminance location are displayed on said video camera image as a cantilever location marker and laser light center of luminance location marker, and optical axis adjustment is performed using these markers.

During optical axis adjustment, an observer can visually confirm the cantilever location and laser light center of luminance location on the video camera image, thus making it easy to align the cantilever location and laser light center of luminance location. Furthermore, by storing the positional relationship in the video camera image of the cantilever location and laser light center of luminance location after completion of optical axis adjustment, optical axis adjustment can be performed based on that data, and so coarse adjustment becomes necessary when the cantilever is replaced. Moreover, by displaying coordinates, the direction of movement of the laser and the distance to the target location can be ascertained, so adjustment becomes easier.

BRIEF DESCRIPTION OF THE DRAWINGS (FIG. 1) is a drawing which schematically illustrates the configuration of the major parts of an atomic force microscope which is an example of embodiment of the present invention. The optical microscope and video camera used for optical axis adjustment are shown at the same time.

Figure 2:
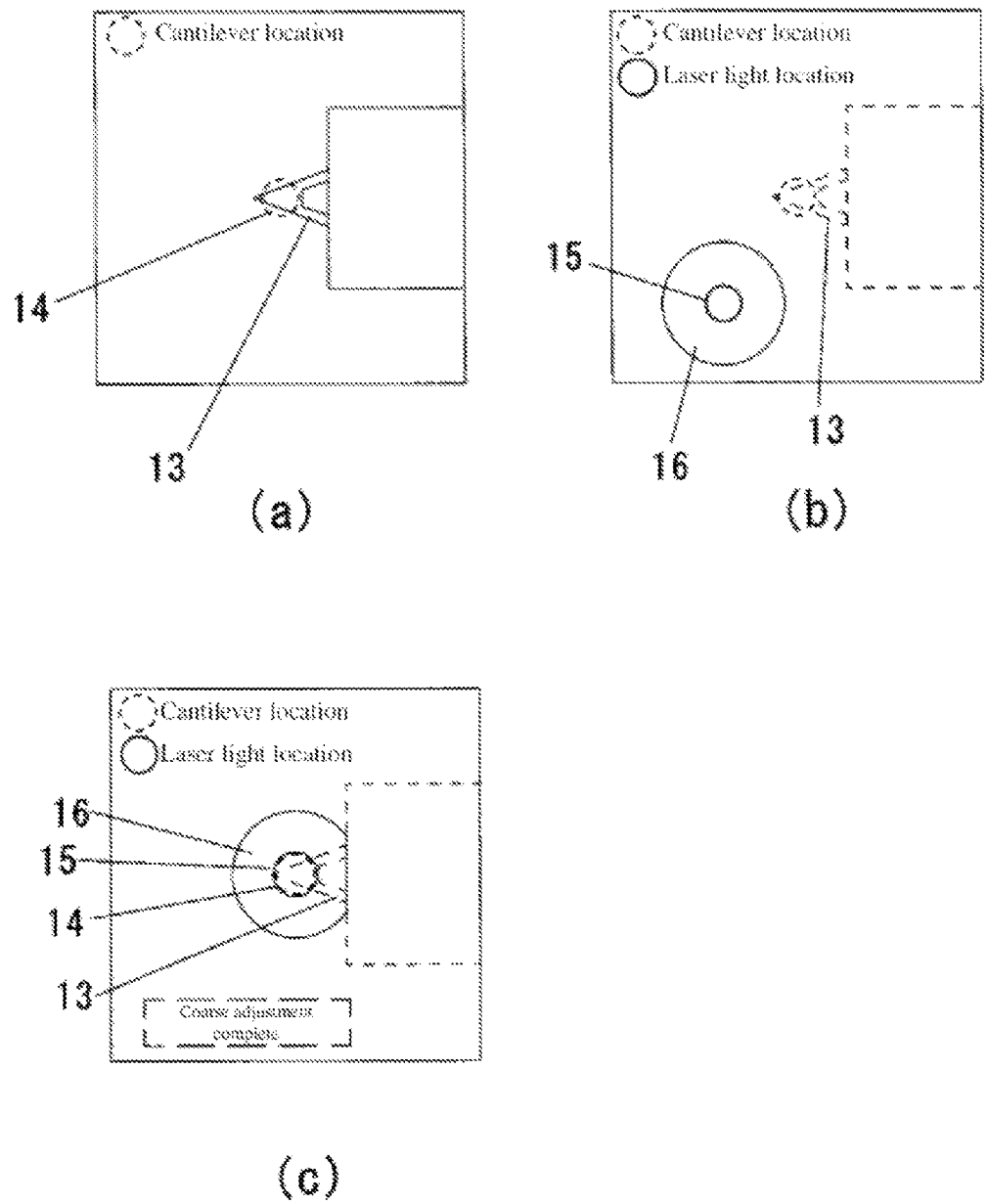

(FIG. 2) illustrates the coarse adjustment procedure in the optical axis adjustment procedure in an example of embodiment of the present invention. FIG. 2(a) is a drawing which illustrates the state where a marker has been displayed at the cantilever location. FIG. 2(b) is a drawing which illustrates the state where markers have been displayed at the laser light and cantilever locations. FIG. 2(c) is a drawing which illustrates the state where the laser light marker has been superposed onto the cantilever marker.

Figure 3:
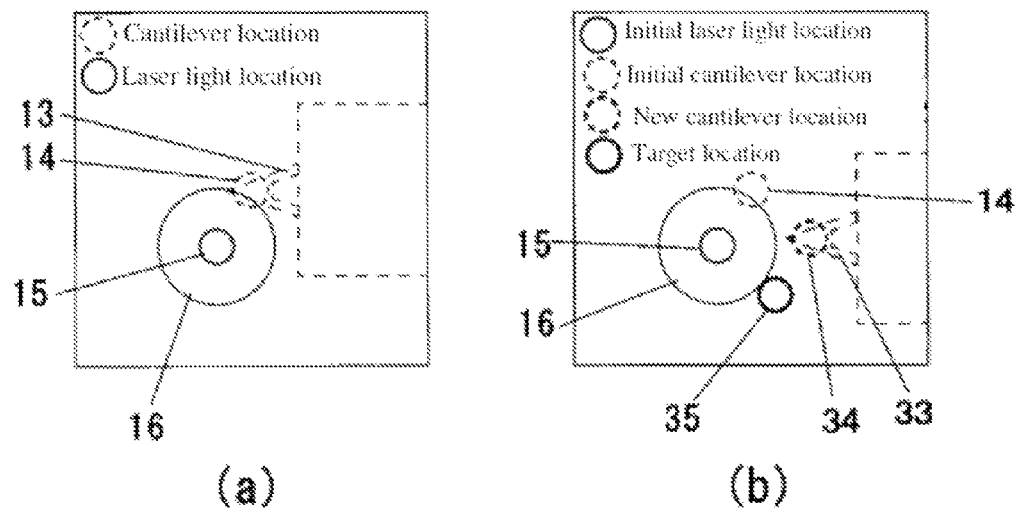

(FIG. 3) illustrates the optical axis adjustment procedure for a new cantilever in an example of embodiment of the present invention. FIG. 3(a) is a drawing which illustrates the initial relative positional relationship of markers for the cantilever and laser light that was stored upon completion of fine adjustment. FIG. 3(b) is a drawing which illustrates the state where a marker indicating the new cantilever location has been displayed, the relative location of laser light has been computed from the stored initial relative positional relationship of markers with reference to that marker, and a target location marker has been displayed using the computed marker location as the target location.

(FIG. 4) is a drawing which illustrates a state where laser light location coordinates have been displayed, taking as reference (coordinates 0, 0) the target location of laser light adjustment for a new cantilever in an example of embodiment of the present invention.

(FIG. 5) is a drawing which schematically illustrates the configuration of the major parts of a conventional atomic force microscope. The optical microscope and video camera used for optical axis adjustment are shown at the same time.

DETAILED DESCRIPTION OF THE EXEMPLARY EMBODIMENTS

Figure 1:
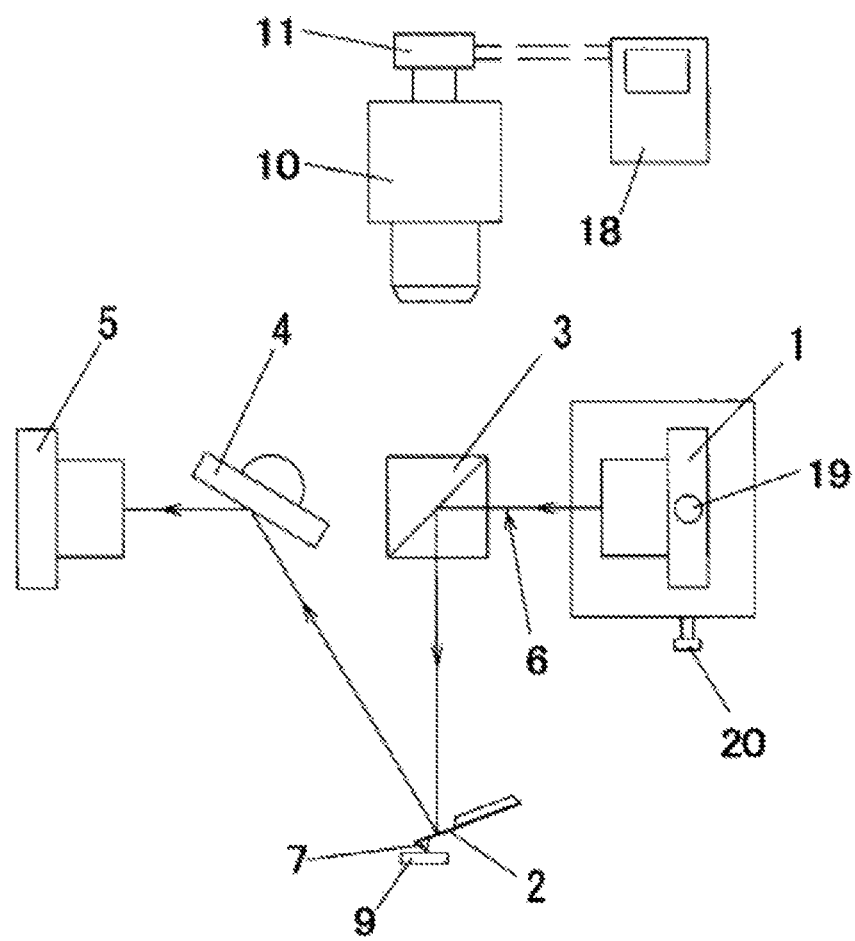

FIG. 1 schematically illustrates the configuration of the major parts of an atomic force microscope which is an example of embodiment of the present invention. The optical microscope 10 and television camera 11 (for example, a CCD camera) used for optical axis adjustment are illustrated at the same time. The principal parts of the atomic force microscope include a laser light source 1, beam splitter 3, cantilever 2, reflective mirror 4 and quadrant photodetector 5. Laser light 6 emitted from laser light source 1 passes through beam splitter 3 and is inputted into the cantilever 2. This laser light 6 is reflected by the cantilever 2 and further passes via reflective mirror 4 and is guided to the quadrant photodetector 5 and detected. It will be noted that the sample 9 is arranged opposite a probe 7 provided on the cantilever 2.

Next, the optical axis adjustment procedure will be described step by step according to FIGS. 1 through 4. An optical microscope 10 for observation and a high magnification video camera 11 are used in combination for the optical axis adjustment operation.

(First Step)

The view field of the optical microscope 10 captures the cantilever 2 and the laser light 6 reflected from the cantilever 2 and the specimen 9, and then a cantilever image 13 and laser light beam image 16 are displayed on the video camera 11. Since the luminance of the laser light 6 in the image of the video camera 11 is strong, the cantilever image portion beside the laser light 6 is displayed as dark, so the high luminance laser light 6 is turned off, and a cantilever location marker 14 is displayed over the cantilever image 13 by an optical axis adjustment device 18. It will be noted that the display of the cantilever location marker 14 is performed through image processing using a technique manually designated by the user or a pattern matching technique. Furthermore, in the present example of embodiment, a dashed line circle is used as the cantilever location marker 14. This state is shown in FIG. 2(a).

(Second Step)

Next, the laser light 6 is turned on, the location of the center of luminance of the laser light beam on the image of the video camera 11 is detected through image processing by the optical axis adjustment device 18, and a laser light center of luminance location marker 15 is displayed over the laser light beam image 16. In the present example of embodiment, a solid line circle is used as the laser light center of luminance location marker 15. Moreover, the cantilever, etc., the display of which is dark due to the high luminance laser light 6, is displayed with a dashed line. This state is shown in FIG. 2(b).

(Third Step)

Next, the laser light center of luminance location marker 15 is moved to the cantilever location marker 14 on the video camera 11 image while moving the laser light source 1 horizontally and vertically by means of laser light adjustment knobs 19 and 20. As the laser light 6 irradiation location moves, the laser light center of luminance location marker 15 on the video camera 11 image moves accordingly, and once the laser light center of luminance location marker 15 and cantilever location marker 14 have been superposed, a coarse adjustment completion signal is displayed on the video camera 11 image by the optical axis adjustment device 18. This state is shown in FIG. 2(c).

(Fourth Step)

Just as in the prior art, the laser light 6 reflected by the cantilever 2 is projected onto a piece of paper directly in front of the quadrant photodetector 5, and the laser light 6 irradiation location is adjusted by means of the laser light adjustment knobs 19 and 20 so as to make the projection of the laser light 6 most bright and round. This step is referred to as fine adjustment.

The initial relative positional relationship of marks for the laser light center of luminance location marker 15 and cantilever location marker 14 on the image of the video camera 11 at the time of completion of fine adjustment is stored in the optical axis adjustment device 18 in the state shown in FIG. 3(a). It will be noted that optical axis adjustment device 18 comprises a storage and display means for location coordinates of the laser light center of luminance location marker 15 and cantilever location marker 14. Next, the location of the quadrant photodetector 5 is adjusted so that the laser light 6 reflected by the cantilever 2 hits the center of the quadrant photodetector 5, whereupon optical axis adjustment is completed. The steps so far are the initial optical axis adjustment for the first cantilever, i.e. the initial cantilever.

In an atomic force microscope, when scanning adjacent specimen surfaces, abrasion of the probe occurs because the cantilever directly contacts the specimen. As a result, the cantilever is frequently replaced, and optical axis adjustment becomes necessary at the time of replacement. Therefore, the method of optical axis adjustment for a replaced new cantilever will be described next in the fifth step.

(Fifth Step)

After the initial cantilever has been replaced with a new cantilever, the high luminance laser light 6 is turned off, and a new cantilever location marker 34 is displayed just as in the first step on the new cantilever image 33 by the optical axis adjustment device 18, as shown in FIG. 3 (b). Next, with reference to the new cantilever location marker 34, the relative location of the new laser light in relation to the new cantilever location is computed based on the initial relative positional relationship of marks stored at the time of completion of fine adjustment shown in FIG. 3(a), and a target location marker 35 is set. This state is shown in FIG. 3(b). Next, the laser light center of luminance location marker 15 is superposed onto the target location marker 35 on the image of the video camera 11 by means of laser light adjustment knobs 19 and 20, thereby completing the optical axis adjustment. Therefore, when replacing with a new cantilever, the optical axis adjustment is carried out in accordance with the fifth step.

Figure 4:
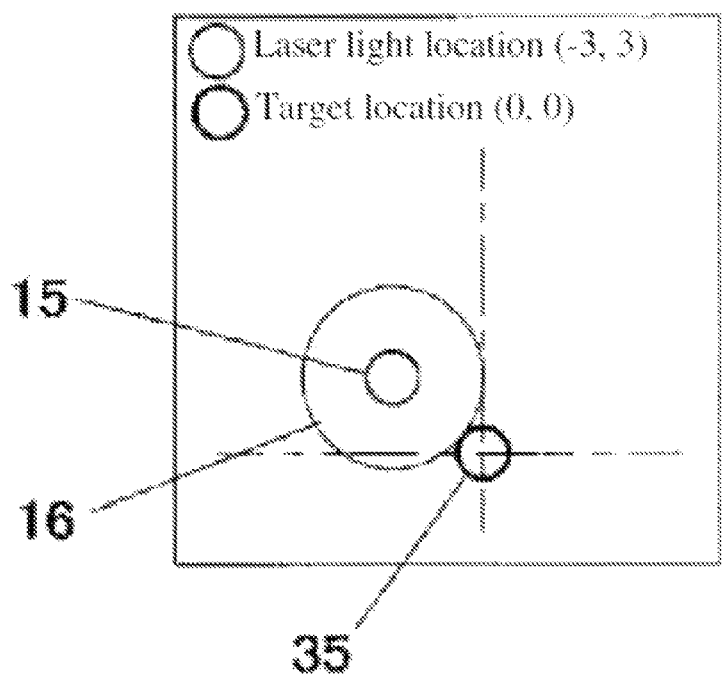

In the fifth step, as shown in FIG. 4, the location coordinates of the laser light center of luminance location marker 15 displayed over the laser beam image 16 are displayed in a new coordinate system using the target location marker 35 as reference (coordinates 0, 0) on the image of the video camera 11 by the optical axis adjustment device 18. Furthermore, the location of the laser light center of luminance location marker 15 is updated by the optical axis adjustment device 18 moment to moment as the laser light 6 moves. Thus, the distance and the direction in which the laser light center of luminance location marker 15 is to be moved in order for it to be superposed onto the target location marker 35 can be ascertained based on the coordinate values of the laser light center of luminance location marker 15, and the distance moved and direction moved can be ascertained based on the changes in location coordinates produced by moving the laser light adjustment knobs 19 and 20.

Furthermore, the target location marker 35 and laser light center of luminance location marker 15 on the image of the video camera 11 shake at the same time due to shaking of the atomic force microscope head, so the location coordinates of the laser light center of luminance location marker 15 using the target location marker 35 as reference are not affected by shaking.

In addition, the optical axis adjustment can be automated by changing the laser light adjustment knobs 19 and 20 for manual optical axis adjustment to motor drive (not illustrated). As described above, by displaying location coordinates of the laser light center of luminance location marker 15, using the target location marker 35 as reference, on the image of the video camera 11 shown in FIG. 4, and performing feedback control in order to align the location of the laser light center of luminance location marker 15 with that target location marker 35, i.e. to make the distance between the two markers zero, automation of optical axis adjustment becomes possible. It will be noted that the optical axis adjustment device 18 comprises a control means which performs said feedback control.

It will be noted that identical reference symbols in FIGS. 1 through 4 refer to identical items or identical features.

DESCRIPTION OF REFERENCE SYMBOLS 1, 21 Laser light source
2, 22 Cantilever
3 Beam splitter
4, 23, 24 Reflective mirror
5, 25 Quadrant photodetector
6, 26 Laser light
7, 27 Probe
9 29 Specimen
10, 40 Optical microscope
11, 41 Video camera
13, 33 Cantilever image
14, 34 Cantilever location marker
15 Laser light center of luminance location marker
16 Laser beam image
18 Optical axis adjustment device
19, 20 Laser light adjustment knobs
35 Target location marker

What is claimed is:

1. A scanning probe microscope, comprising:
a cantilever provided with a probe arranged so as to face a specimen;
a laser light source which outputs a laser light;
a first reflector which guides laser light radiated from said laser light source toward said cantilever;
a second reflector which guides laser light reflected from said cantilever toward a photodetector;
a photodetector which detects said laser light; and a video camera which observes the location in the vicinity of the cantilever for optical axis adjustment of said laser light, and
a display means which displays, on the video camera image, a cantilever location marker which indicates the location of said cantilever and a laser light center of luminance location marker which indicates the location of the center of luminance of said laser light, wherein the laser light center of luminance location marker moves over the video camera image in a manner that tracks the movement of said laser light.

2. The scanning probe microscope described in claim 1, characterized in that it comprises a storage and display means which stores and displays an initial relative positional relationship of markers, indicating the positional relationship of the initial cantilever location marker and initial laser light center of luminance location marker after completion of initial optical axis adjustment for the initial cantilever.

3. The scanning probe microscope described in claim 2, characterized in that, when said initial cantilever has been replaced with a new cantilever, the relative location of new laser light in relation to the new cantilever location is calculated on the basis of said initial relative positional relationship of markers and is set as a target location marker, and a coordinate system is provided having said target location marker as its origin.

4. The scanning probe microscope described in claim 3, characterized in that it comprises a control means for superposing said initial laser center of luminance location marker onto said target location marker.

* * * * *